United States Patent [19]

Pirlet

[11] Patent Number: 4,752,695
[45] Date of Patent: Jun. 21, 1988

[54] PLANARITY DETECTION METHOD FOR A MOVING ROLLED STRIP EMPLOYING SIDE EDGE DETECTION WITH RESPECT TO A REFERENCE SURFACE

[75] Inventor: Robert Pirlet, Embourg, Belgium

[73] Assignee: Centre de Recherches Metallurgiques Centrum Voor Research in de Metallurgie, Brussels, Belgium

[21] Appl. No.: 860,292

[22] Filed: May 6, 1986

[30] Foreign Application Priority Data

May 6, 1985 [BE] Belgium .............................. 6/48087

[51] Int. Cl.$^4$ ........................ G01N 21/86; G01V 9/04
[52] U.S. Cl. .................................. 250/560; 250/561; 356/376
[58] Field of Search .................. 250/560, 561; 356/1, 356/4, 371, 376

[56] References Cited

U.S. PATENT DOCUMENTS

| 3,749,493 | 7/1973 | Macovski | 356/376 |
| 4,158,507 | 6/1979 | Himmel | 356/376 |
| 4,322,627 | 3/1982 | Pirlet | 250/561 |
| 4,492,472 | 1/1985 | Asano et al. | 356/376 |
| 4,498,778 | 2/1985 | White | 356/376 |
| 4,541,722 | 9/1985 | Jenks | 356/376 |

Primary Examiner—David C. Nelms
Assistant Examiner—William L. Oen
Attorney, Agent, or Firm—Holman & Stern

[57] ABSTRACT

A method wherein the levels of a plurality of points on the surface of a moving rolled strip are determined in relation to a horizontal reference plane by optical triangulation and planarity, or flatness, indices of the strip are deduced therefrom. The position of at least one of the side edges of the strip is detected with respect to a predetermined fixed reference in a cross-section of the strip containing at least plurality of points. The real, or true, position of the point with respect to the fixed reference is deduced and the orientation of the emitted beam and of the re-transmitted, or reflected, beam used in the triangulation is modified to compensate for the real, or true, position of the point.

6 Claims, 1 Drawing Sheet

PLANARITY DETECTION METHOD FOR A MOVING ROLLED STRIP EMPLOYING SIDE EDGE DETECTION WITH RESPECT TO A REFERENCE SURFACE

BACKGROUND TO THE INVENTION

Field of the Invention

This invention relates to a method of determining the planarity or flatness, of a moving rolled strip. More particularly to the case of a metal strip, or steel strip, leaving a rolling mill stand.

Description of Prior Art

A method is already known, inter alia from U.S. Pat. No. 4,541,723, in which a plurality of points or the moving strip surface are surveyed by optical triangulation, by means of laser beams, and indices of the planarity, or flatness, of the strip are determined. As a general rule, the points surveyed with this system lie along the median axis of the strip and two or four lateral axes parallel to the median axis, depending on the strip width.

In this known method, the sighting points can be displaced laterally so as to cover the width of the strip whenever the width of the strips for rolling changes. Normally, once the position of these sighting points has been established for a strip of given width, it remains unchanged during the rolling of this strip or a number of successive strips of the same nominal width.

However, the strip frequently undergoes transverse movements during rolling, with the result that its median axis moves away from the virtual line described on the strip by the fixed central sighting point. The same shift of course affects the other axes surveyed.

This leads to a serious disadvantage because the planarity indices determined from these incorrect measurements are no longer sufficiently representative of the real planarity of the strip.

SUMMARY OF THE INVENTION

The object of this invention is to provide a method whereby the above disadvantage can be obviated by ensuring that the sighting points, and particularly the points situated on the median axis of the strip, follow the strip during its lateral movements.

The invention is based on the use of a width gauge, which is conventionally used in rolling mills, in which two detectors continuously determine the position of the edges and hence the strip width. Such gauges generally serve to monitor compliance with the width conditions that the strip is required to satisfy.

The invention provides a method of determining the planarity, or flatness, of a rolled strip in which the level of a plurality of points on the surface of the strip is determined in relation to a horizontal reference plane by optical triangulation using at least one optical triangulation system and planarity indices of the strip are deduced therefrom; the position of at least one of the side edges of the strip is detected with respect to a predetermined fixed reference in a cross-section of the strip containing at least one of the plurality of points the real, or true, position of the point with respect to the fixed reference is deduced therefrom; and the orientation of the emitted beam and of the re-transmitted, or reflected, beam constituting the triangulation is modified to compensate for the real, or true, position of the point.

Preferably, the optical triangulation system used, is situated in the plane of the cross-section of the strip; and the point is the center-point of the strip in the cross-section considered.

The horizontal reference plane may be the horizontal plane tangential to the strip transport conveyor rollers and the predetermined fixed reference may be the central longitudinal vertical plane of the conveyor.

Variation in the orientation of the emitted and re-transmitted, or reflected, beams may be provided either by pivoting the transmitter and receiver devices themselves or, if such devices are fixed, by rotation of movable deflectors disposed in the path of the emitted and re-transmitted, or reflected, beams.

Preferably, the real, or true, position with respect to a predetermined fixed reference is determined simultaneously for a plurality on points of the surface of the strip; and the levels of those points with respect to a horizontal reference plane is measured, i.e. the height of each point above the horizontal reference plane.

These operations are advantageously carried out at uniform intervals of time and preferably continuously and at high speed.

In that case the level measurements can be combined with the distance covered by the strip, the speed of which is known, to establish a topographic map, to the required scale, of the strip surface and to calculate the planarity, or flatness indices.

This method is particularly advantageous in the case of thick sheet in which each triangulation covers a portion of the strip width. According to a variant of the invention, the strip is scanned transversely and measuring points are so selected as to position them on uniformly spaced lines which reflect the strip edge.

When the edge is sufficiently rectilinear, scanning may be effected in a strip portion limited by straight lines substantially parallel to a fixed direction defined, for example, by the side edge of the conveyor.

BRIEF DESCRIPTION OF THE DRAWINGS

The invention will now be described in detail by way of example in order to facilitate an understanding thereof with reference to the accompanying drawings wherein FIG. 1 diagrammatically illustrates compensation for transverse movement of the strip in a method according to the invention.

DETAILED DESCRIPTION

Figure 1:
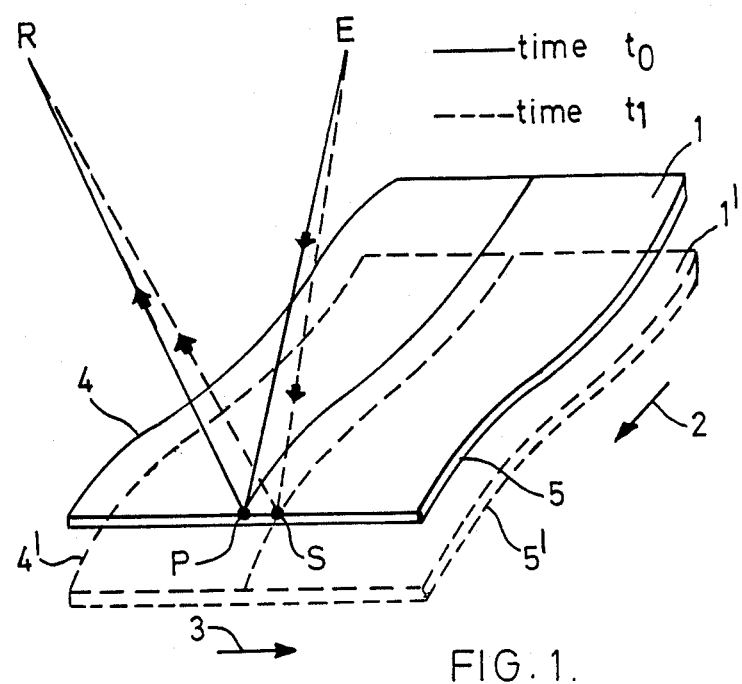

Referring to FIG. 1, strip 1 moves in the rolling direction denoted by the arrow 2. The strip 1 is also subject to transverse movement indicated by the arrow 3. In the case illustrated in FIG. 1, which represents the combination of these two movements, at a time $t_o$ the strip occupies position 1 (shown in solid line) and at a later time $t_1$ it occupies the position 1' (shown in broken line). The positions of the side edges 4,4' and 5,5' respectively of the strip is logged by a width gauge (not shown) of a type conventionally used on strip rolling mills. This gauge enables the theoretical position of the strip edges to be determined, and hence any point of the transverse cross-section of the strip, such as a center-point P between the edges.

To allow for the transverse movements of the strip, the real, or true, positions of the two side edges of the strip are detected, preferably continuously, and from this the real, or true, position of a center-point is deduced. At time $t_1$ the strip has progressed in the direction of the arrow 2 and, by transverse shift in the direction of arrow 3, the center-point of the sighted cross-section occupies the position S. The value of the distance PS, representing the transverse shift of the strip at the time $t_1$, is determined and the inclinations of the incident rays EP and the reflected rays PR are varied accordingly, the inclinations respectively becoming ES and SR, to enable the real, or true, position of the sighted point (relative to a given horizontal plane) at the time $t_1$ to be measured by triangulation.

With the method described above it is therefore possible to determine the planarity, or flatness, indices along the true median axis of the strip. Of course the method is also applicable to determination of the planarity, or flatness indices along any longitudinal axis of the strip.

Planarity indices may be calculated as described, for example, in the above-mentioned U.S. Pat. No. 4,541,723, the disclosure of which is hereby incorporated by reference.

Figure 2:
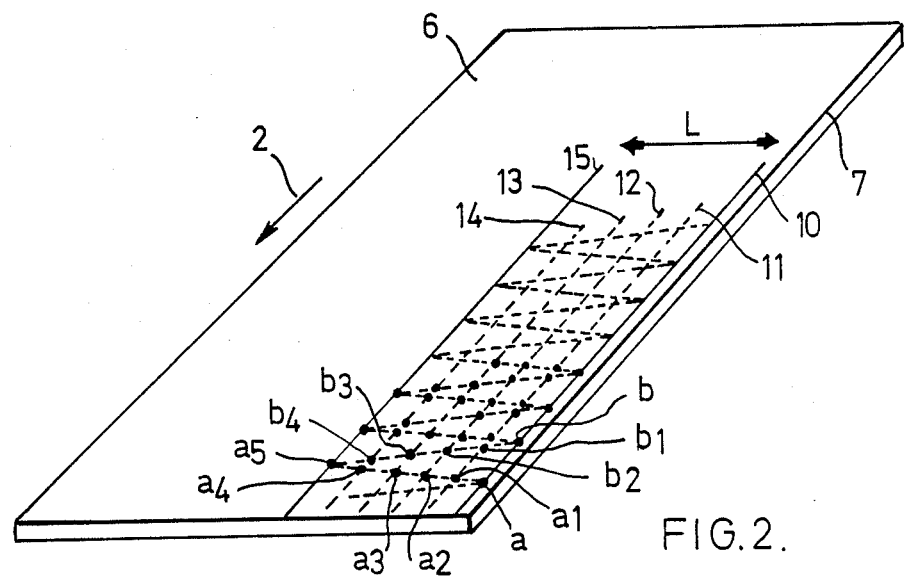
FIG. 2 diagrammatically illustrates the scanning of the surface of a thick sheet.

FIG. 2 illustrates the determination of the planarity of a thick sheet 6 moving in the rolling direction indicated by the arrow 2.

By means of a triangulation survey system which is not shown but is similar to that shown in FIG. 1, i.e. comprising an emitter E (e.g. a laser) and a receiver R, a sheet portion of width L contained between two lines 10 and 15 parallel to the side edge 7 of the sheet is scanned. Between these two end lines 10,15 there are also shown lines 11 to 14 which are parallel to the side edge 7. The position of the lines 10 to 15 with respect to the edge of the sheet is known. During scanning, the incident beam describes on the sheet a zig-zag path denoted by broken lines, which intersects the longitudinal lines 10–15 at points such as a $a_1, a_2, \ldots b, b_1, b_2$. The planarity, or flatness, indices of the strip alongthe longitudinal lines 10–15 are determined by detecting the real, or true, position of these points a . . . b, and a topographic map of this portion of the sheet surface is established.

In this way the planarity, or flatness, of a surface portion of any size can be determined by means of a single deformable triangulation.

I claim:

1. A method for determining the flatness of a strip of material having an edge and running substantially longitudinally and being subjected to irregular transverse movements with respect to the longitudinal direction of movement, comprising:
    establishing a reference plane with respect to which the strip of material is running;
    establishing a predetermined laterally fixed reference relative to said strip;
    in at least one cross-section of the strip in which one point of a plurality of points lies, detecting the lateral position of the edge of the strip relative to said laterally fixed reference;
    deducing from said detected lateral position of said edge the true position of said one point with respect to said laterally fixed reference;
    modifying the orientation of an emitted incident beam and reflected beam so that the point of incidence of said emitted beam coincides with said true position of said one point;
    measuring the levels of said plurality of points on a surface of the strip relative to said reference plane by at least one optical triangulation system, including said emitted incident beam directed onto said surface and said reflected beam from said surface produced by said incident beam, said plurality of points being at a known distance from an edge of said strip; and
    determining a flatness index from said measured levels of the points.

2. The method as claimed in claim 1 and further comprising:
    positioning said at least one optical triangulation system in the plane of said at least one cross-section of the strip; and wherein
    said at least one point is at the center of said at least one cross-section.

3. The method as claimed in claim 1 wherein:
    said reference plane is a horizontal reference plane.

4. The method as claimed in claim 3 and further comprising:
    determining said true position with respect to said predetermined fixed reference simultaneously for a plurality of other points on the surface of the strip lying in said at least one cross-section; and
    measuring the levels of said other points with respect to the horizontal reference plane.

5. The method as claimed in claim 4 and further comprising:
    carrying out said level measurements at uniform intervals of time;
    measuring the distances covered by the moving strip during said intervals of time; and
    combining said measurings for producing a topographic map of the surface of the strip and for calculating planarity indices.

6. The method as claimed in claim 4 wherein at least one optical triangulation covers a portion of the width of the strip and further comprising:
    transversely scanning said portion of the width of the strip by corresponding optical triangulation; and
    selecting said other points as measuring points positioned on uniformly spaced lines parallel to the strip edge.

* * * * *